US011432080B2

(12) United States Patent
Ruaro et al.

(10) Patent No.: US 11,432,080 B2
(45) Date of Patent: Aug. 30, 2022

(54) HEARING DEVICE WITH INTEGRATED MAGNETIC INDUCTION COIL AND RF ANTENNA

(71) Applicant: GN HEARING A/S, Ballerup (DK)

(72) Inventors: Andrea Ruaro, Ballerup (DK); Sinasi Özden, Ballerup (DK)

(73) Assignee: GN HEARING A/S, Ballerup (DK)

( * ) Notice: Subject to any disclaimer, the term of this patent is extended or adjusted under 35 U.S.C. 154(b) by 398 days.

(21) Appl. No.: 16/683,203

(22) Filed: Nov. 13, 2019

(65) Prior Publication Data

US 2020/0178007 A1    Jun. 4, 2020

(30) Foreign Application Priority Data

Nov. 30, 2018 (EP) ..................................... 18209630

(51) Int. Cl.
H04R 25/00 (2006.01)
G08C 17/04 (2006.01)
H04B 5/00 (2006.01)

(52) U.S. Cl.
CPC ........... H04R 25/554 (2013.01); G08C 17/04 (2013.01); H04B 5/0081 (2013.01)

(58) Field of Classification Search
CPC ..... H04R 25/554; G08C 17/04; H04B 5/0081
See application file for complete search history.

(56) References Cited

U.S. PATENT DOCUMENTS

| 2002/0039428 A1* | 4/2002 | Svajda ................. H04R 25/554 381/331 |
| 2011/0216929 A1 | 9/2011 | Jang et al. |
| 2013/0223664 A1 | 8/2013 | Meskens et al. |
| 2015/0319545 A1 | 11/2015 | Kerselaers et al. |
| 2016/0366525 A1* | 12/2016 | Bodvarsson ....... A61N 1/37223 |

FOREIGN PATENT DOCUMENTS

| EP | 3103511 A1 | 12/2016 |
| EP | 3273703 | 1/2018 |
| WO | WO 2005/081583 A1 | 9/2005 |
| WO | WO 2006/122836 A2 | 11/2006 |
| WO | WO 2006/122836 A3 | 11/2006 |

OTHER PUBLICATIONS

Extended European Search Report dated May 23, 2019 for corresponding European Application No. 18209630.5.
Foreign Exam Report for EP Patent Appln. No. 18209630.5 dated Apr. 14, 2022.

* cited by examiner

Primary Examiner — Sunita Joshi
(74) Attorney, Agent, or Firm — Vista IP Law Group, LLP

(57) ABSTRACT

A hearing device includes: one or more microphones configured to generate one or more microphone output signals based on a received audio signal; a signal processor coupled to the one or more microphones; a wireless communication unit; a magnetic induction control chip; and a magnetic induction coil; wherein the magnetic induction control chip is coupled to a first end of a first conductive element and to a first end of a second conductive element; and wherein the wireless communication unit is coupled to the first end of the first conductive element and to the first end of the second conductive element, and wherein a second end of the first conductive element and a second end of the second conductive element are coupled via the magnetic induction coil.

23 Claims, 6 Drawing Sheets

HEARING DEVICE WITH INTEGRATED MAGNETIC INDUCTION COIL AND RF ANTENNA

RELATED APPLICATION DATA

This application claims priority to, and the benefit of, European Patent Application No. 18209630.5 filed on Nov. 30, 2018. The entire disclosure of the above application is expressly incorporated by reference herein.

FIELD

The present disclosure relates to hearing devices, such as hearing devices for compensating a hearing loss of a user, particularly hearing devices having wireless communication capabilities and thus hearing devices comprising antennas for communication.

The present disclosure further relates to a hearing device configured to communicate using magnetic induction and through the use of radio frequencies. The hearing device may be used in a binaural hearing device system. During operation, the hearing device is worn in the ear of a user for alleviating a hearing loss of the user.

BACKGROUND

Hearing devices are very small and delicate devices and comprise many electronic and metallic components contained in a housing or shell small enough to fit in the ear canal of a human or be located behind the outer ear. The many electronic and metallic components in combination with the small size of the hearing device housing or shell impose high design constraints on radio frequency antennas to be used in hearing devices with wireless communication capabilities.

Moreover, the antenna in the hearing device must be designed to achieve a satisfactory performance despite these limitations and other narrow design constraints imposed by the size of the hearing device.

The developments within wireless technologies for hearing devices and the continuous efforts to make hearing devices smaller and more cost effective to manufacture has led to the use of flexible carriers incorporating one or more antennas in hearing devices.

Still further, in binaural hearing device systems, the requirements to the quality of the communication between the hearing devices in the binaural hearing device system are ever increasing, and include demands for low latency and low noise, increasing the requests for effective antennas in the hearing devices.

All these demands provide difficult to solve with existing devices, as the present communication capabilities are insufficient.

SUMMARY

It is an object to provide a hearing device with radio frequency (RF)-antenna functionality, such as Bluetooth, at low cost and low device complexity. It is a further object to provide a hearing device allowing for communication using magnetic induction.

It is also an object to improve the wireless communication capabilities, such as improved wireless communication capabilities between two hearing devices worn in or behind opposite ears of the user, and/or between a hearing device and an accessory device, such as a smart phone. The hearing devices may be configured for wireless communication in an ISM frequency band. The RF antenna functionality may be implemented for operation at a frequency of at least 400 MHz, such as at a frequency of between 800 MHz and 6 GHz.

Radio connectivity between hearing devices allows for advanced binaural signal processing when the important ear-to-ear (E2E) link is ensured. Furthermore, the hearing devices may be connected to a plethora of accessories, either body-worn or being placed in the user's proximity, and hence to the Internet as part of the so-called Internet-of-things (IoT). However, it is challenging but of key importance to ensure a stable E2E link. The 2.4 GHz ISM (Industrial, Scientific, Medical) band is preferred due to the presence of many harmonized standards for low-power communications, such as Bluetooth Low Energy (BLE) or ZigBee, its worldwide availability for industrial use, and the trade-off between power consumption and achievable range. The E2E link is particularly demanding in terms of requirements on the wearable antenna design and performance. In fact, to achieve a good on-body performance the antenna may exhibit optimal radiation efficiency, bandwidth, polarization, and radiation pattern, while the physical volume available for the design is extremely reduced, as most times space comes at a premium in wearable devices such as hearing devices, in particular in-the-ear (ITE) hearing devices. Furthermore, mass production and industrial design needs provide a desire that the antenna may also be low-profile, lightweight, and inexpensive to manufacture. The antenna polarization characteristic may be an important performance parameter. More overall constrains may also be relevant. In fact, antenna efficiency may be seriously jeopardized by the proximity of the antenna to the human head, as the body tissues have very high losses around 2.4 GHz due to their high water content. This may critically impact the overall performance given the magnitude of the drop-in efficiency and the fact that the hearing device radios operate in an ultra-low-power regime. Another issue threatening antenna efficiency may be the small volume available for the design, as this necessarily brings the antenna in close physical, hence, as well as electromagnetic, proximity of other parts of the device, with a strong likelihood of coupling to them. A large bandwidth is hard to achieve as well for an electrically small antenna (ESA) due to its fundamental limits. The bandwidth may cover at least the whole 2.4 GHz ISM band, but a larger bandwidth may help to compensate for the detuning of the antenna caused by the effects of the body, effects which varies across users.

Magnetic induction, or near-field magnetic induction (NFMI), typically provides communication, including transmission of voice, audio and data, in a range of frequencies between 2 MHz and 15 MHz. At these frequencies the electromagnetic radiation propagates through and around the human head and body without significant losses in the tissue.

In accordance with the present disclosure, the above-mentioned and other objects are obtained by the disclosed hearing device. The hearing device comprises one or more microphones configured to generate one or more microphone output signals based on a received audio signal. The hearing device comprises a signal processor configured to process the one or more microphone output signals. The hearing device comprises a wireless communication unit, and a magnetic induction control chip. The magnetic induction control chip is interconnected to a first end of a first conductive element and to a first end of a second conductive element. The wireless communication unit is interconnected to the first end of the first conductive element and to the first end of the second conductive element, and wherein a second end of the first conductive element and a second end of the second conductive element are interconnected via a magnetic induction coil.

In some embodiments, the hearing device comprises a microphone configured to receive an audio signal, and the audio signal is provided to a signal processor configured to process the audio signal for compensating a hearing loss of a user. The signal processor may comprise elements such as amplifiers, compressors and noise reduction systems, etc. for processing the audio signal to compensate a hearing loss of a user.

In some embodiments, the first conductive element and the second conductive element couple electromagnetically at radio frequencies to form an RF antenna.

The first conductive element and the second conductive element may extend alongside each other. The first conductive element and the second conductive element may propagate within the hearing device so that a distance between the first conductive element and the second conductive element does not exceed a threshold distance. The threshold distance is selected so that the first conductive element couples electromagnetically to the second conductive element when the distance between the first and second conductive element is below the threshold distance. The first conductive element and the second conductive element positioned in the hearing device within a threshold distance of each other are configured for emission and reception of an electromagnetic field.

In some embodiments, the first conductive element and the second conductive element positioned in the hearing device within a threshold distance of each other are configured to form an RF antenna. Typically, the distance between the first conductive element and the second conductive element is selected to be within a near-field of the electromagnetic field configured to be emitted or received at the wireless communication unit, such as within a distance of $1/2\pi$ of the wavelength of the operational electromagnetic field. In some embodiments, the distance is below $1/5$ of the wavelength, such as below $1/10$ of the wavelength, between $1/5$ and $1/15$, such as between $1/5$ and $1/10$ of the wavelength.

In some embodiments, the wireless communication unit is configured for emission and reception of an electromagnetic field. The wireless communication unit may be configured for communicating with another electronic device. The data communicated via the wireless communication unit may include data, audio, voice, settings, information, etc.

In some embodiments, the length of the first conductive element corresponds to the length of the second conductive element. In some embodiments the length of the first conductive element is different from the length of the second conductive element. In some embodiments, the length of the first conductive element corresponds to the length of the second conductive elements within +/−10%, such as within +/−25% or vice versa. Thus, the length of the first conductive element may be e.g. 10% longer than the length of the second conductive element.

Typically, the length of the RF antenna is defined in relation to a wavelength $\lambda$ of the electromagnetic field to be emitted from and/or received by the hearing device when it is positioned at its intended operational position at the ear of a user. The hearing device is typically configured to emit and/or receive electromagnetic radiation within a specific frequency range or band. In some embodiments, the RF frequency band is provided so as to include a resonance frequency for the antenna elements. Typically, the length of the antenna elements are optimized for use within such specific RF frequency bands, such as in a band about, or extending from, a peak resonant frequency.

For an RF antenna to be resonant, the length of the resonating element in free air is selected to correspond to an odd multiple of a quarter-wavelength, $\lambda/4$, of a wavelength $\lambda$ of the electromagnetic radiation to be emitted from the hearing device.

Typically, the length of the RF antenna is selected to optimize the RF antenna for use at a specific frequency or within a specific frequency band, such as selected to provide an optimum resonance at a specific frequency, such as within a desired frequency band. Typically, the antenna is optimized for ISM bands, including cellular and WLAN bands, such as for GSM bands or WLAN bands.

In some embodiments, the length of the antenna the first conductive element and/or the length of the second conductive elements is a quarter of a wavelength $\lambda$ or any multiple thereof, $\lambda$ being the wavelength corresponding to the emitted electromagnetic field.

In some embodiments, the length of the antenna the first conductive element and/or the length of the second conductive elements corresponds approximately to a quarter of a wavelength of the electromagnetic field to be emitted and/or received, such as corresponds to half a wavelength +/−5%, such as +/−10%, such as +/−15%. It is envisaged that the closer the correspondence between the length of the first conductive element and/or the length of the second conductive element and a resonance frequency within a range of frequencies of the electromagnetic field, the more efficient the antenna. Thus, the efficiency of the RF antenna may be optimized by optimizing the length of the antenna, i.e. the length of the first conductive element and the second conductive element, in accordance with the frequency/frequencies at which the electromagnetic field is to be emitted and/or received.

In some embodiments the RF antenna is an electrical antenna. In some embodiments, the RF antenna is a monopole antenna. In some embodiments, the RF antenna is a resonant antenna, such as an RF antenna configured to emit an electromagnetic field in a wavelength range about a resonance frequency.

The frequency band may be an RF frequency band comprising a frequency selected from the following frequencies, such as comprising 433 MHz, 800 MHz, 915 MHz, 1800 MHz, 2.4 GHz, 5.8 GHz, etc. Thus, the RF frequency band may be selected as an ISM band, such as a GSM band or a WLAN band comprising any one or more of these frequencies.

The hearing devices as disclosed herein may be configured for operation in an ISM frequency band. Preferably, the RF antenna is configured for operation at a frequency of at least 400 MHz, such as of at least 800 MHz, such as of at least 1 GHz, such as at a frequency between 1.5 GHz and 6 GHz, such as at a frequency between 1.5 GHz and 3 GHz such as at a frequency of 2.4 GHz. The antenna may be optimized for operation at a frequency of between 400 MHz and 6 GHz, such as between 400 MHz and 1 GHz, between 800 MHz and 1 GHz, between 800 MHz and 6 GHz, between 800 MHz and 3 GHz, etc.

However, it is envisaged that the hearing device as herein disclosed is not limited to operation in such a frequency band, and the hearing device may be configured for operation in any frequency band.

In some embodiments, the hearing device is configured to communicate using magnetic induction, such a near-field magnetic induction. In some embodiments, the magnetic induction control chip is an integrated circuit implementing magnetic induction transmit and receive functions, such as magnetic induction transmit and receive control functions. The magnetic induction control chip is interconnected to the magnetic induction coil e.g. via electrical wires or via electrical conductive traces on a support substrate. The hearing device comprising the magnetic induction control chip and the magnetic induction coil is being configured to communicate using magnetic induction, such a near-field magnetic induction. The magnetic induction control chip is configured to control power supply to the magnetic induction coil.

In some embodiments, the magnetic induction control chip is configured to apply any modulation schemes including amplitude modulation, phase modulation, and/or frequency modulation to the data signal to be communicated via magnetic induction so that data are modulated onto the magnetic field emitted from the magnetic induction coil. The magnetic induction control chip may comprise circuits, such as circuits implementing low noise amplifiers (LNA), mixers and filters. The magnetic induction control chip may also comprise peripheral digital blocks such as frequency dividers, codec blocks, demodulators, etc.

In some embodiments, the magnetic induction coil is furthermore configured for receiving a magnetic field communicated by another electronic device, such as via a magnetic induction coil of another electronic device, and providing the received data signal to the magnetic induction control chip. The magnetic induction control chip is configured to demodulate the received signal. In some embodiments the magnetic induction control chip is configured as a transceiver. In some embodiments, the magnetic induction control chip is configured to receive and transmit data at a particular frequency.

The data communicated may include data, audio, voice, settings, information, etc.

The magnetic induction coil and the magnetic induction control chip may be configured to operate at a frequency below 100 MHz, such as at below 30 MHz, such as below 15 MHz, during use. The magnetic induction coil may be configured to operate at a frequency range between 1 MHz and 100 MHz, such as between 1 MHz and 15 MHz, such as between 1 MHz and 30 MHz, such as between 5 MHz and 30 MHz, such as between 5 MHz and 15 MHz, such as between 10 MHz and 11 MHz, such as between 10.2 MHz and 11 MHz. The frequency may further include a range from 2 MHz to 30 MHz, such as from 2 MHz to 10 MHz, such as from 2 MHz to 10 MHz, such as from 5 MHz to 10 MHz, such as from 5 MHz to 7 MHz.

However, it is envisaged that the hearing device as herein disclosed is not limited to operation in such a frequency band, and the hearing device may be configured for operation in any frequency band.

It is an advantage that by one or more embodiments as presented, an RF antenna and a magnetic induction coil may be provided in the hearing device. To have an RF antenna and a magnetic induction coil provided in the hearing device increases the wireless communication capabilities of the hearing device. However, providing both an RF antenna and a magnetic induction coil within a hearing device, with the restrictions as set out above pertaining to size, noise, EMC regulations, etc. has typically led to an increased size of the hearing devices to obtain the improved communication capabilities.

Furthermore, in present day communication systems, numerous different communication systems communicate at or about 2.4 GHz, and thus there is also a significant environmental electromagnetic noise in the frequency range at or about 2.4 GHz. It is an advantage that for some applications for which the noise may be acceptable, for example for data communication, an RF antenna may be used. For other applications, in which a high noise level may impact the transmission significantly, a magnetic induction coil may be used. For example, the magnetic induction coil may be used for streaming of audio.

In one or more embodiments, the RF antenna is configured for data communication at a first bit rate. In one or more embodiments, the magnetic induction coil is configured for data communication at a second bit rate, the second bit rate being larger than the first bit rate, such as by a factor 10, such as by a factor 30, a factor 50, a factor 100, etc.

It is an advantage of using magnetic induction that typically low latency may be obtained. Especially when streaming audio, it is of importance to keep the latency low, to avoid delays noticeable by a user. Typically, a delay of less than 100 ms, such as of less than 50 ms, such as of less than 25 ms, such as of less than 10 ms, such as of less than 5 ms, such as of less than 1 ms, may be obtained by use of magnetic induction for communication.

It is a further advantage of using magnetic induction for example for communicating between a first hearing device and a second hearing device in a binaural system that for the low frequencies, i.e. typically below 100 MHz, and corresponding long wavelengths, the head is not considered as a significant obstacle for the electromagnetic radiation emitted by the second antenna, thus, the reduction of electromagnetic radiation due to tissue absorption is reduced when the frequency is reduced.

In some embodiments, the impedance of the magnetic induction coil is selected so that the RF antenna has a free end at radio frequencies. The magnetic induction coil may in some examples have an impedance larger than a threshold inductance, such as an inductance larger than 2 µH, such as an inductance larger than 3 µH, such as larger than 3.5 µH, such as about 3.9 µH or an inductance of up to 5 µH. The inductance may be selected to be between 2 µH and 5 µH, such as between 3 µH and 4 µH. For the RF antenna, such an inductance above a threshold inductance corresponds to a free end for the RF antenna comprised of the first conductive element and the second conductive element.

In some embodiments, the RF antenna is configured to have a free end at radio frequencies. In some examples, the free end of the RF antenna is obtained by selecting an inductance of the magnetic induction coil to be larger than a threshold inductance, such as an inductance larger than 2 µH, such as an inductance larger than 3 µH, such as larger than 3.5 µH, such as about 3.9 µH or an inductance of up to 5 µH. The inductance may be selected to be between 2 µH and 5 µH, such as between 3 µH and 4 µH. In some embodiments, for an RF antenna having a free end, a propagating electromagnetic field will form standing waves along the RF antenna, depending on the length of the RF antenna relative to the wavelength of the electromagnetic field.

In some embodiments, the magnetic induction control chip is connected to the first end of the first conductive element through a first inductor and to the first end of the second conductive element through a second inductor. In some embodiments, the first inductor and the second inductor are configured to provide a high frequency filter so as to minimize or prevent high frequency RF signals, such as high frequency RF signals stemming from the wireless communication unit from reaching the magnetic induction control chip.

In some embodiments, the wireless communication unit is connected to the first end of the first conductive element through a first capacitor and to the first end of the second conductive element through a second capacitor. In some embodiments, the first capacitor and the second capacitor are configured to provide a low frequency filter so as to minimize or prevent low frequency signals, such as low frequency signals stemming from the magnetic induction control chip from reaching the wireless communication unit. In some embodiments, the circuit connecting the wireless communication unit to the first end of the first conductive element and the first end of the second conductive element further comprises a balun, an impedance matching circuit or any other control circuit, typically comprising controlled impedances, configured for optimising RF antenna parameters.

In some embodiments, the hearing device comprises a battery. The battery may be any type of battery. The battery may be a flat battery, such as a button shaped battery. The battery may be circular. The battery may be a disk-shaped battery.

In some embodiments, the magnetic induction control chip and the wireless communication unit are provided at a first side of the battery, wherein the magnetic induction coil is provided at a second side of the battery, wherein the first side is different from the second side.

In some embodiments, the battery is configured to provide an electromagnetic shield between the magnetic induction control chip and the wireless communication unit provided at the first side of the battery and the magnetic induction coil provided at the second side of the battery.

Especially, for the magnetic induction coil operating at a frequency below 10 MHz or below 100 MHz, is it advantageous that the battery is provided between the induction coil and the hearing device electric components, as the magnetic induction coil operating at such frequencies could be susceptible to noise originating from the hearing device electric components.

In some embodiments, the battery may be provided closer to a second end of the hearing device than to a first end of the hearing device, and the magnetic induction coil may be provided between the battery, such as between a center axis of the battery, and the second end of the hearing device. The wireless communication unit and the magnetic induction control chip may be provided between the battery, such as between the center axis of the battery, and the first end of the hearing device.

The first side of the battery and the second side of the battery may be opposite sides of the battery, either transversely or longitudinally.

It is an advantage of providing a dual mode antenna configuration with same components, in that the size of the hearing device may be reduced, while at the same time increasing the wireless capability.

In some embodiments, at least a part of the first conductive element and at least a part of the second conductive element interconnects the signal processor and the one or more microphones. Hereby, the signal lines extending from the signal processor to the one or more microphones may be used also as at least a part of the first conductive element and/or as at least a part of the second conductive element.

Typically, such signal lines are provided as wires running freely in the hearing device from the signal processor to the microphone and/or the magnetic induction coil. This enables a compact fit with the hearing device, which is particularly preferable for custom fit hearing devices. However, for hearing devices comprising antennas, such free running wires provides an influence on the electromagnetic field emitted and/or received at any antennas in the hearing device which influence differs between different hearing devices as the assembly process is manual, and as custom hearing devices may vary in size. Thus, in some embodiments, a more controlled positioning of the wires, such as Litz wires, is preferable.

In some embodiments, the one or more microphones are provided at a carrier board and the signal processor is provided at the carrier board, and wherein the at least part of the first conductive element and the at least part of the second conductive element are provided as conductive traces in the carrier board interconnecting the one or more microphones and the signal processor.

This provides for an advantageous control pertaining to the position of the wires within the hearing device. In such an embodiment, the part of the first and second conductive elements connecting the one or more microphones and the magnetic induction coil would still be free running wires.

In some embodiments, one or more of the magnetic induction control chip, the wireless communication unit and the signal processor are provided in a multi-chip assembly, and wherein the multi-chip assembly is provided at a carrier board. The multi-chip assembly may be termed a hybrid. The multi-chip assembly may comprise a multi-layered structure for accommodating at least some of the hearing device electric components. The multi-chip assembly may comprise a multi-layered printed circuit board.

The multi-chip assembly may be any assembly of integrated circuits, semiconductor dies and/or other discrete electronic components. The multi-chip assembly comprises two or more electronic components integrated in the assembly. The electronic components may be provided as "bare dies"; however it is envisaged that some, or all, electronic components of the multi-chip assembly may be pre-packaged while other, or none, of the electronic components of the multi-chip assembly may be mounted as bare dies or chips or vice versa. The multi-chip assembly may referred to as a hybrid multi-chip assembly as a number of electronic components are inter-connected. The multi-chip assembly may comprise a multi-layered structure for accommodating at least some of the hearing device electric components. The multi-chip assembly may comprise a multi-layered printed circuit board. The electronic components are integrated and mounted onto a substrate so that the multi-chip assembly may be handled as a single assembly comprising multiple electronic components. In some embodiments, the multi-chip assembly is provided as a single component for mounting in a hearing device.

In some embodiments, the magnetic induction coil is provided at the carrier board. In some embodiments, the multi-chip assembly and the magnetic induction coil are provided at the carrier board. The carrier board interconnecting the multi-chip assembly and the magnetic induction coil comprises the first conductive element and the second conductive element provided as conductive traces.

In some embodiments, the multi-chip assembly, the one or more microphones and the magnetic induction coil are provided at the carrier board, and at least a part of the first conductive element and the second conductive element may comprise the signal lines between the signal processor and the one or more microphones.

The carrier board may be comprised by a flexible board, such as a flexible printed circuit board, and the carrier board may be formed in one part. In some embodiments, the carrier board is formed of a number of sub-carrier boards, the sub-carrier boards being interconnected with short wires or conductive parts.

In some embodiments, the carrier board comprises an electromagnetic shielding layer. The electromagnetic shielding layer may be a coated layer, such as a layer coated by a conductive coating, such as copper, such as conductive ink, the electromagnetic shielding layer may be a metallic layer, such as a sheet metal layer, etc.

In some embodiments, the carrier board is configured to form an electromagnetic shield between the multi-chip assembly and the one or more microphones.

In some embodiments, the magnetic induction coil is provided at the first side of the battery; the multi-chip assembly is provided at the first side of the battery, and wherein the carrier board provides an electromagnetic shield between the multi-chip assembly and the magnetic induction coil.

By using the carrier board as electromagnetic shield, the multi-chip assembly, comprising e.g. both the wireless communication unit and the signal processor, can be provided at a same side of the battery as the magnetic induction coil antenna.

In some embodiments, the first and second conductive elements extend at least partly along a top side of the hearing device.

For example for a behind-the-ear hearing device, the hearing device may, when being positioned in the intended operational position behind the ear of a user, have a first side extending along a side of the head of the user, and a second side opposite to the first side. Typically, the first side and second side are longitudinal sides of the BTE hearing device. A top side interconnects the first side and the second side and is positioned facing away from the ear of the user. Typically, a bottom side likewise interconnects the first side and the second side, the bottom side facing towards the ear of the user.

In another example, an in-the-ear hearing device has a top side. The hearing device may, when being positioned in the intended operational position in the ear of a user, have a shell extending into the ear canal, and the top side being the side of the in-the-ear hearing device facing away form the ear canal of the user. Typically, the top side will be parallel to the faceplate of an in-the-ear hearing device. Typically, a bottom side of the in-the-ear hearing device will be facing towards the ear canal of the user.

In some embodiments, the magnetic induction coil has a longitudinal direction being parallel to an ear-to-ear axis of a user of the hearing device, when the hearing device is provided in the intended operational position at the ear of a user. In one or more embodiments, the magnetic induction coil has a longitudinal extension in a direction being parallel to, or being substantially parallel to, or being 0/180 degrees +/−35 degrees, to an ear-to-ear axis of a user, when the hearing device is worn in its operational position during use.

In some embodiments, the battery is a rechargeable battery and the hearing device comprises a re-chargeable battery controller. In some embodiments, the re-chargeable battery controller is part of the multi-chip assembly.

In some embodiments, the magnetic induction antenna is configured to communicate with another hearing device of a binaural hearing device.

In some embodiments, the RF antenna is configured to communicate with body external devices, such as accessory devices.

In some embodiments, the hearing device is an ITC hearing device type, a CIC hearing device type, a BTE hearing device type, a hearing protection device, or any combination of the types.

According to a further aspect, a binaural hearing device system is disclosed, the binaural hearing device system comprising a first hearing device and a second hearing device configured to be provided at a first ear (e.g. left ear) and a second ear (e.g. right ear) of the user, respectively, and wherein one or both of the hearing devices is/are a hearing device as herein disclosed.

The hearing device comprises a wireless communications unit configured for wireless data communication. The wireless communication unit may comprise a transmitter, a receiver, a transmitter-receiver pair, such as a transceiver, a radio unit, etc. The wireless communication unit may be configured for communication using any protocol as known for a person skilled in the art, including Bluetooth, including Bluetooth Low Energy, Bluetooth Smart, etc., WLAN standards, manufacturer-specific protocols, such as tailored proximity antenna protocols, such as proprietary protocols, such as low-power wireless communication protocols, such as low-power wireless communication protocols, such as CSR mesh, etc., RF communication protocols, magnetic induction protocols, etc. The one or more wireless communication units may be configured for communication using same communication protocols, or same type of communication protocols, or the one or more wireless communication units may be configured for communication using different communication protocols.

The processing unit is configured for providing a processed audio signal. The term sound and/or the term acoustic output may be understood to be an audio signal. Thus, the microphone may be configured to receive sound or an audio signal. An output transducer or speaker/receiver may be configured to provide or transmit an acoustic output or a processed audio signal, such as the processed audio signal provided by the processing unit. The acoustic output or processed audio signal may be provided or transmitted to an ear of the user wearing the hearing device during use.

It will be appreciated that the speaker of a hearing device is also known in the art as a "receiver". The term speaker is used herein to avoid confusion with other hearing device components.

The present disclosure relates to different aspects including the hearing device described above and in the following, and corresponding hearing devices, binaural hearing devices, hearing devices, hearing devices, systems, methods, devices, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
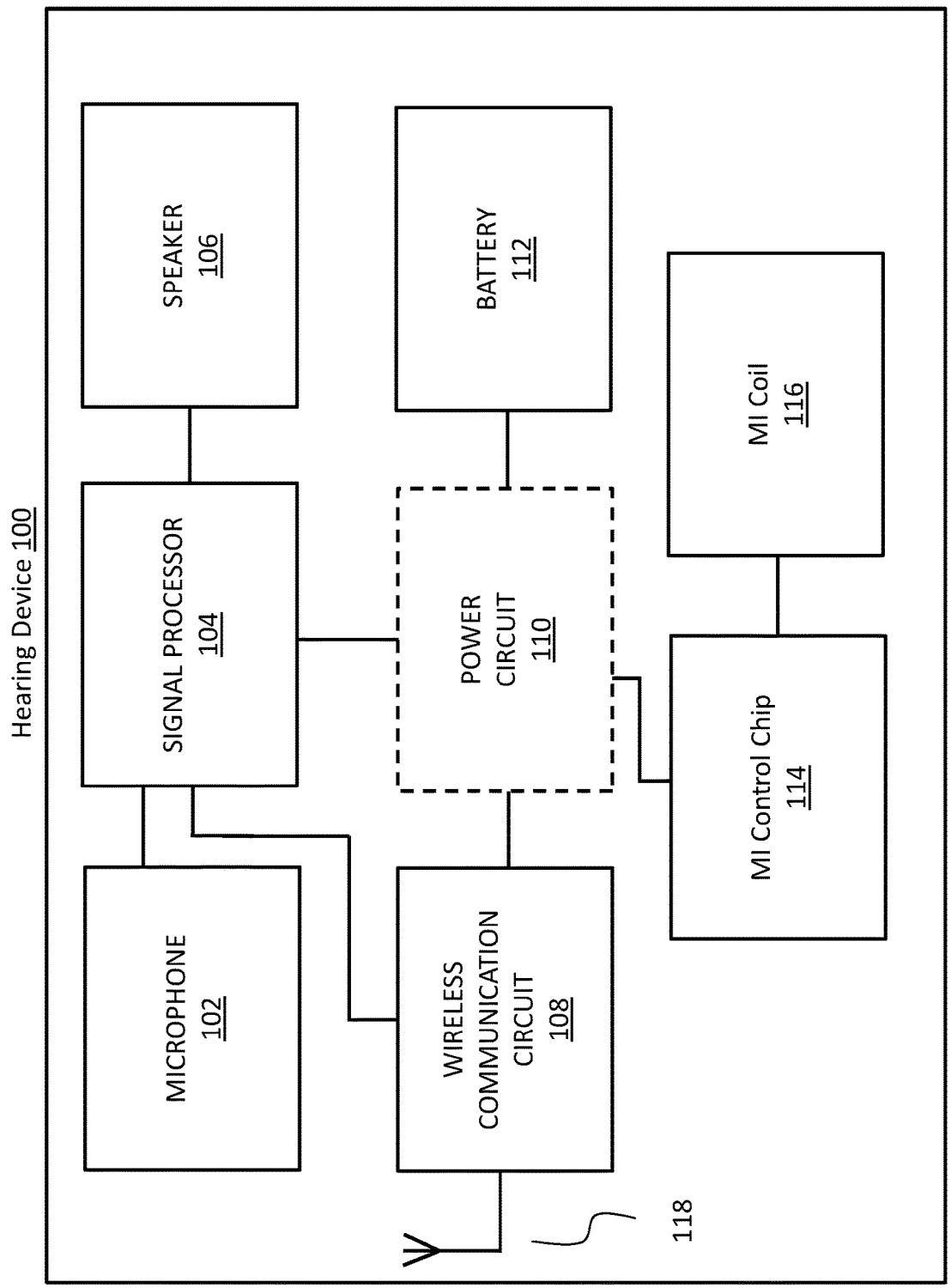
FIG. 1 schematically illustrates an example of components in hearing device, FIG. 2 schematically illustrates the interconnection between MI control chip, wireless communication unit, and magnetic induction coil, FIG. 3 schematically illustrates an exemplary hearing device, FIG. 4 schematically illustrates another exemplary hearing device, FIG. 5 schematically illustrates a further exemplary hearing device, FIG. 6 schematically illustrates a still further exemplary hearing device.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

As used herein, the term "antenna" refers to an electrical device which converts electric power into radio waves. An electric antenna may comprise an electrically conductive material connected to e.g. a wireless communications unit, such as a radio chip, a receiver, a transmitter or a transceiver.

The claimed invention may be embodied in different forms and should not be construed as limited to the embodiments set forth herein.

A block-diagram of an embodiment of a hearing device 100 is shown in FIG. 1. The hearing device 100 comprises a first transducer, i.e. microphone 102, to generate one or more microphone output signals based on a received an audio signal. The one or more microphone output signals are provided to a signal processor 104 for processing the one or more microphone output signals. A receiver or speaker 106 is connected to an output of the signal processor 104 for converting the output of the signal processor into a signal modified to compensate for a user's hearing impairment, and provides the modified signal to the speaker 106.

The hearing device signal processor 104 may comprise elements such as an amplifier, a compressor and/or a noise reduction system etc. The hearing device may further have a filter function, such as compensation filter for optimizing the output signal. The hearing device may furthermore have a wireless communication unit 108, such as a wireless communication circuit, for wireless data communication interconnected with an RF antenna 118 for emission and reception of an electromagnetic field. The wireless communication unit 108, including a radio or a transceiver, connect to the hearing device signal processor 104 and the RF antenna 118, for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device located at another ear, typically in a binaural hearing device system. The hearing device further comprises a magnetic induction (MI) control chip 114 interconnected with magnetic induction coil 116. The hearing device 100 further comprises a power source 112, such as a battery or a rechargeable battery. Furthermore, a power circuit 110 is provided for controlling the power provided from the battery 112 to the signal processor 104, the wireless communication unit 108, and the magnetic induction control chip 114. The magnetic induction coil is configured for communication with another electronic device, in some embodiments configured for communication with another hearing device, such as another hearing device located at another ear, typically in a binaural hearing device system.

Figure 2:
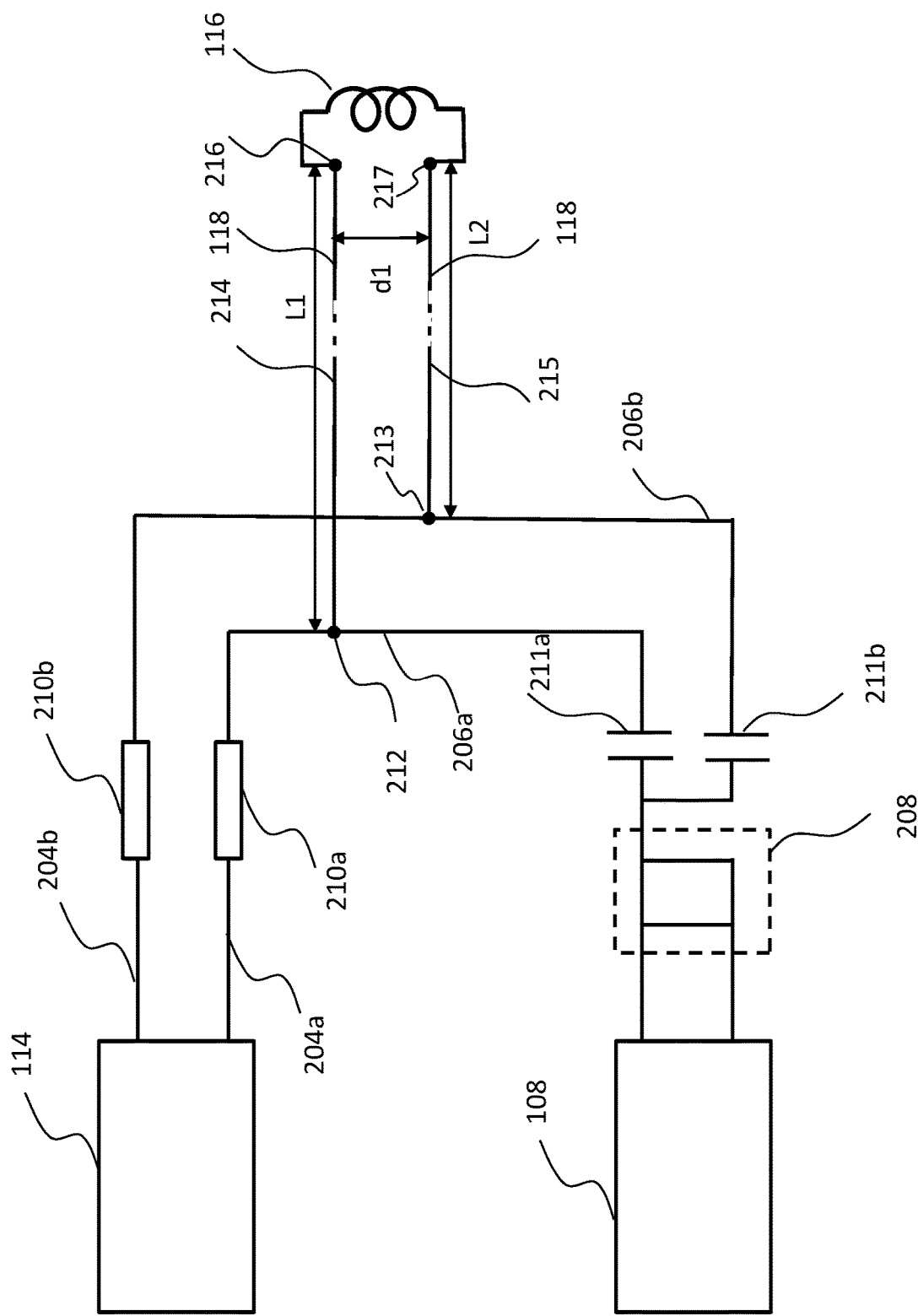

FIG. 2 schematically illustrates the interconnection between the magnetic induction (MI) control chip 114 and the wireless communication unit 108, and the magnetic induction coil 116 according to an embodiment.

The MI control chip 114 is interconnected to the MI coil 116 via first and second conducting wires 204*a*, 204*b*, first and second inductors 210*a*, 210*b* and first and second conductive elements 214, 215.

The MI control chip may comprise a processor (not shown) configured to control power supply to the magnetic induction coil 116 and configured to apply any modulation schemes including amplitude modulation, phase modulation, and/or frequency modulation to the signal provided to the MI coil, so that data are modulated onto the magnetic field. Hereby, the magnetic induction coil is configured to communicate via magnetic induction with another electronic device, such as via near field magnetic induction communication. More specifically, the first conducting wire 204*a* interconnects the MI control chip 114 and a first end 212 of the first conductive element 214 through first inductor 210*a*. A second end 216 of the first conductive element 214 connects to one end of the magnetic induction coil 116. Likewise, the second conducting wire 204*b* interconnects the MI control chip 114 and a first end 213 of the second conductive element 215 through second inductor 210*b*. A second end 217 of the second conductive element 215 connects to another end of the magnetic induction coil 116. For the MI coil 116, and the data signal sent from the MI control chip to the MI coil, the conductive elements 214, 215 provide the data signal from the MI control chip to the MI coil.

The wireless communication unit 108 is interconnected to the MI coil 116 via an antenna matching circuit, such as balun 208, first and second transmission lines 206*a*, 206*b*, first and second capacitors 211*a*, 211*b* and first and second conductive elements 214, 215. More specifically, the first transmission line 206*a* interconnects the wireless communication unit 108 and a first end 212 of the first conductive element 214 through balun 208 and first capacitor 211*a*. A second end 216 of the first conductive element 214 connects to one end of the magnetic induction coil 116. Likewise, the second transmission line 206*b* interconnects the wireless communication unit 108 and a first end 213 of the second conductive element 215 through second capacitor 211*b*. A second end 217 of the second conductive element 215 connects to another end of the magnetic induction coil 116. A distance d1 between the first conductive element and the second conductive element is selected to allow for electromagnetic coupling between the first conductive element 214 and the second conductive element 215 at RF frequencies, and particularly at the frequency of the electromagnetic field at which the wireless communication unit 108 is configured for emission and reception, i.e. at the operational electromagnetic field for the wireless communication unit.

Typically, the distance between the first conductive element 214 and the second conductive element is selected to be within a near-field of the operational electromagnetic field for the wireless communication unit, such as within a distance of $1/2\pi$ of the wavelength of the operational electromagnetic field. In some embodiments, the distance is below $1/5$ of the wavelength, such as below $1/10$ of the wavelength such as between $1/5$ and $1/10$ of the wavelength.

The magnetic induction coil 116 has an inductance above a threshold, so that the electromagnetic field, i.e. the electromagnetic RF field, will see a free end. Thus, the inductance is selected to be larger than 3 µH, such as larger than 3.5 µH, such as about 3.9 µH.

The RF antenna comprises the first conductive element 214 and the second conductive element 215 positioned so as to couple electromagnetically. The first conductive element has a first length L1 and the second conductive element has a second length L2, indicated in FIG. 2 (not to scale). The first length extending from the first end 212 of the first conductive element 214, to the second end 216 of the first conductive element, the second length extending from the first end 213 of the second conductive element 215 to the second end 217 or the second conductive element 215. The first length may be similar to the second length, the first length may be equal to the second length, the first length may be equal to the second length +/−10%.

The length of the RF antenna 118 is typically selected to correspond to approximately a quarter of a wavelength (or any multiple thereof, such as any odd multiple thereof) of the wavelength of the operational electromagnetic field. The length of the RF antenna 118 may be the efficient length of the first conducting element and the second conducting element coupling electromagnetically.

Figure 3:
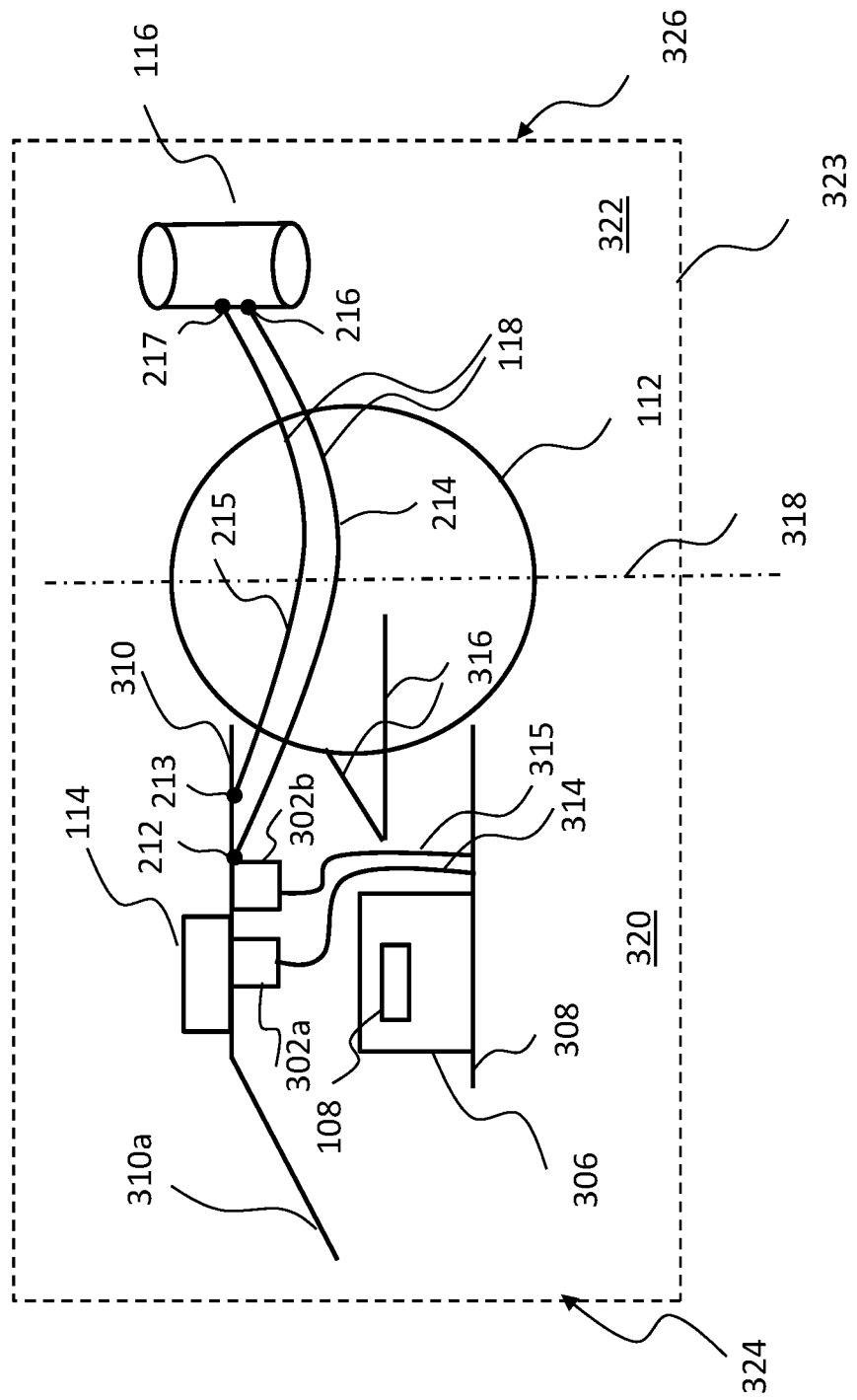

FIG. 3 schematically illustrates an embodiment of a hearing device, the hearing device comprising a wireless communication unit 108, a first microphone 302*a*, a second microphone 302*b*, a battery 112 with battery contacts 316, a magnetic induction control chip 114, a magnetic induction coil 116, and an RF antenna 118. The hearing device may comprise further components, including signal processor, speaker/receiver, etc., which are not shown in FIG. 3. The hearing device is shown schematically as 323.

The hearing device in FIG. 3 comprises a first carrier board 308 and a hybrid multi chip assembly 306 being positioned at the first carrier board 308. The wireless communication unit 108 may be provided as part of the hybrid multi chip assembly 306. The hybrid multichip assembly 306 may further comprise the signal processor (not shown). The battery 112 supplies power to the hybrid multichip assembly 306 via battery contacts 316. It is seen in FIG. 3 that the magnetic induction control chip 114 and the wireless communication unit 108 are provided at a first side 320 of the battery, and wherein the magnetic induction coil 116 is provided at a second side 322 of the battery, wherein the first side 320 is different from the second side 322. The first side 320 is provided at a first side of a center axis 318 of the battery 112, and the second side 322 is provided at a second side of the center axis 318. The battery 112 is provided closer to the second end 326 of the hearing device 323 than to the first end 324 of the hearing device 323, and the magnetic induction coil 116 is provided between the battery 116, such as between the center axis 318 of the battery, and the second end 326 of the hearing device. The wireless communication unit 108 and the magnetic induction control chip 114 are provided between the battery 112, i.e. between the center axis 318 of the battery, and the first end 324 of the hearing device 323. In an embodiment, the first end 324 may be oriented towards a tympanic membrane of a user, when the hearing device is worn by the user. In an embodiment, the second end 326 may be oriented towards a environment of a user, when the hearing device is worn by the user.

The hearing device 323 in FIG. 3 further comprises a second carrier board 310. The first microphone 302*a* and the second microphone 302*b* are provided at the second carrier board 310 at a first side of the second carrier board. The magnetic induction control chip 114 is provided at a second side of the second carrier board 310. The first side of the second carrier board 310 may face the hybrid multichip assembly 306 so that the first and second microphones 302*a*, 302*b* are provided facing the hybrid multichip assembly 306. The second side of the second carrier board 310 is facing away from the hybrid multichip assembly 306, and thus the magnetic induction control chip 114 is provided at the side of the second carrier board 310 facing away from the hybrid multichip assembly 306. Hereby, the second carrier board 310 provides an electromagnetic shield between the hybrid multichip assembly 306, comprising the wireless communication unit 108, the microphones 302*a* and 302*b*, and the magnetic induction control chip 114.

The microphones 302*a*, 302*b* are interconnected with the hybrid multichip assembly 306, possibly via the first carrier board 308, for power supply and signal transmission, via conductive wires 314, 315. In some embodiments, the conductive wires (microphone wires) 314, 315 additionally interconnect the wireless communication unit 108 with the first end 212 of the first conductive element 214 and with the first end 213 of the second conductive element 215 at the second carrier board 310 through capacitive elements as seen in FIG. 2. The magnetic induction control chip 114 is likewise interconnected to the first end 212 of the first conductive element 214 and with the first end 213 of the second conductive element 215 through inductive elements as seen in FIG. 2. The first and second conductive elements 214, 215 interconnects the magnetic induction control chip and the magnetic coil 116. The first and second conductive elements 214, 215 are also functioning as RF antenna 118 for the wireless communication unit 108.

In some embodiments, the first end 212 of the first conductive element 214 and the first end 213 of the second conductive element may be provided at the first carrier board 308, instead of at the second carrier board, and the RF antenna may comprise the conductive wires 314, 315 and the first and second conductive elements 214, 215. Hereby, the length of the RF antenna may be increased.

It is seen that the magnetic induction coil 116 is provided at a second side 322 of the battery 112 opposite from the hybrid multichip assembly 306, the wireless communication unit 108 and the magnetic induction control chip 114 being provided at a first side of the battery. Hereby, the battery provides an electromagnetic shield between the magnetic induction coil and the remaining hearing device components, including the hybrid multichip assembly 306, the wireless communication unit 108 and the magnetic induction control chip 114.

The first carrier board 308 and/or the second carrier board 310 may be a printed circuit board, PCB, such as a flexible printed circuit board, Flex PCB. In some embodiments, the printed circuit board is provided with a shielding layer, improving the shielding properties of the printed circuit board.

Figure 4:
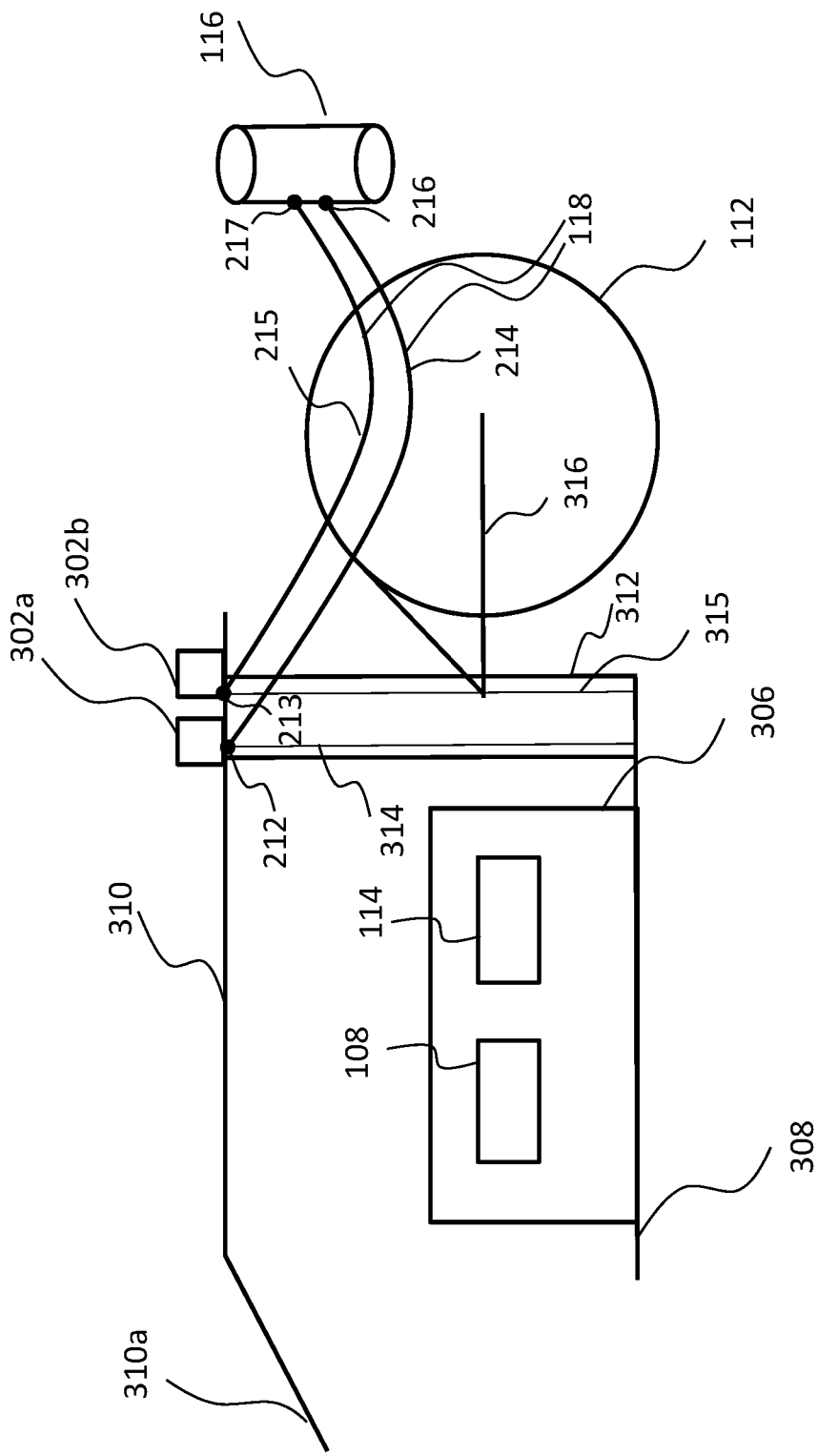

FIG. 4 schematically illustrates an embodiment of a hearing device, the hearing device comprising a wireless communication unit 108, a first microphone 302*a*, a second microphone 302*b*, a battery 112 with battery contacts 316, a magnetic induction control chip 114, a magnetic induction coil 116, a wireless communication unit 108 and an RF antenna 118. The hearing device may comprise further components, including signal processor, speaker, etc., which are not shown in FIG. 3.

The hearing device in FIG. 4 comprises a first carrier board 308 and a hybrid multi chip assembly 306 being positioned at the first carrier board 308. The wireless communication unit 108 may be provided as part of the hybrid multi chip assembly 306. The magnetic induction control chip 114 may be provided as part of the hybrid multichip assembly 306. The hybrid multichip assembly 306 may further comprise the signal processor (not shown). The battery 112 supplies power to the hybrid multichip assembly 306 via battery contacts 316.

The hearing device in FIG. 4 furthermore has a third carrier board 312, the third carrier board interconnecting the first carrier board and the second carrier board. In FIG. 4, the conductive wires (microphone wires) 314, 315 are provided as traces on the third carrier board 312. The hybrid multichip assembly 306 comprises the wireless communication unit 108 and the magnetic induction control chip 114. The first and second microphones 302a, 302b are provided at the second carrier board 310, at the second side of the carrier board, facing away from the first carrier board. It is envisaged that in some embodiments, the first and second microphones may be positioned at the third carrier board 312, at the side of the third carrier board facing the battery. The second (or third) carrier board 310 (312) may thereby form a shield between the hybrid multichip assembly 306 and the first and second microphones 302a and 302b.

It is envisaged that the hybrid multichip assembly and the one or more microphones may be positioned in numerous ways ensuring that a carrier board 308, 310, 310a, <312 provides an electromagnetic shield between the hybrid multichip assembly 306 and the one or more microphones 302a, 302b. However, it is envisaged that an electromagnetic shield between the hybrid multichip assembly 306 and the one or more microphones 302a, 302b is optional.

The third carrier board may be a printed circuit board, such as a flexible printed circuit board.

The wireless communication unit 108 is interconnected with the first end 212 of the first conductive element 214 and with the first end 213 of the second conductive element 215 at the second carrier board 310 through capacitive elements as seen in FIG. 2. The magnetic induction control chip 114 is likewise interconnected to the first end 212 of the first conductive element 214 and with the first end 213 of the second conductive element 215 through inductive elements as seen in FIG. 2. The first and second conductive elements 214, 215 interconnects the magnetic induction control chip and the magnetic coil 116. The first and second conductive elements 214, 215 are also functioning as RF antenna 118 for the wireless communication unit 108. In some embodiments, the first end 212 of the first conductive element 214 and the first end 213 of the second conductive element 215 are provided at the first carrier board 308. The first part of the first conductive element and the first part of the second conductive element extending from the first carrier board 308 to the second carrier board 310 (i.e. conductive wires 314, 315) additionally provides a connection between the hybrid multichip assembly 306 and the first and second microphones 302a, 302b. Thus, at least a part of the first conductive element 214 and at least a part of the second conductive element 214 interconnects the signal processor 104 and the one or more microphones 302a, 302b.

It is envisaged that the first carrier board, the second carrier board and the third carrier board may be separate carrier boards interconnected via conductive parts, such as conductive strips, or the first carrier board, the second carrier board and the third carrier board may form part of a single carrier board, the single carrier board being bend to provide the first carrier board, the second carrier board and the third carrier board.

Figure 5:
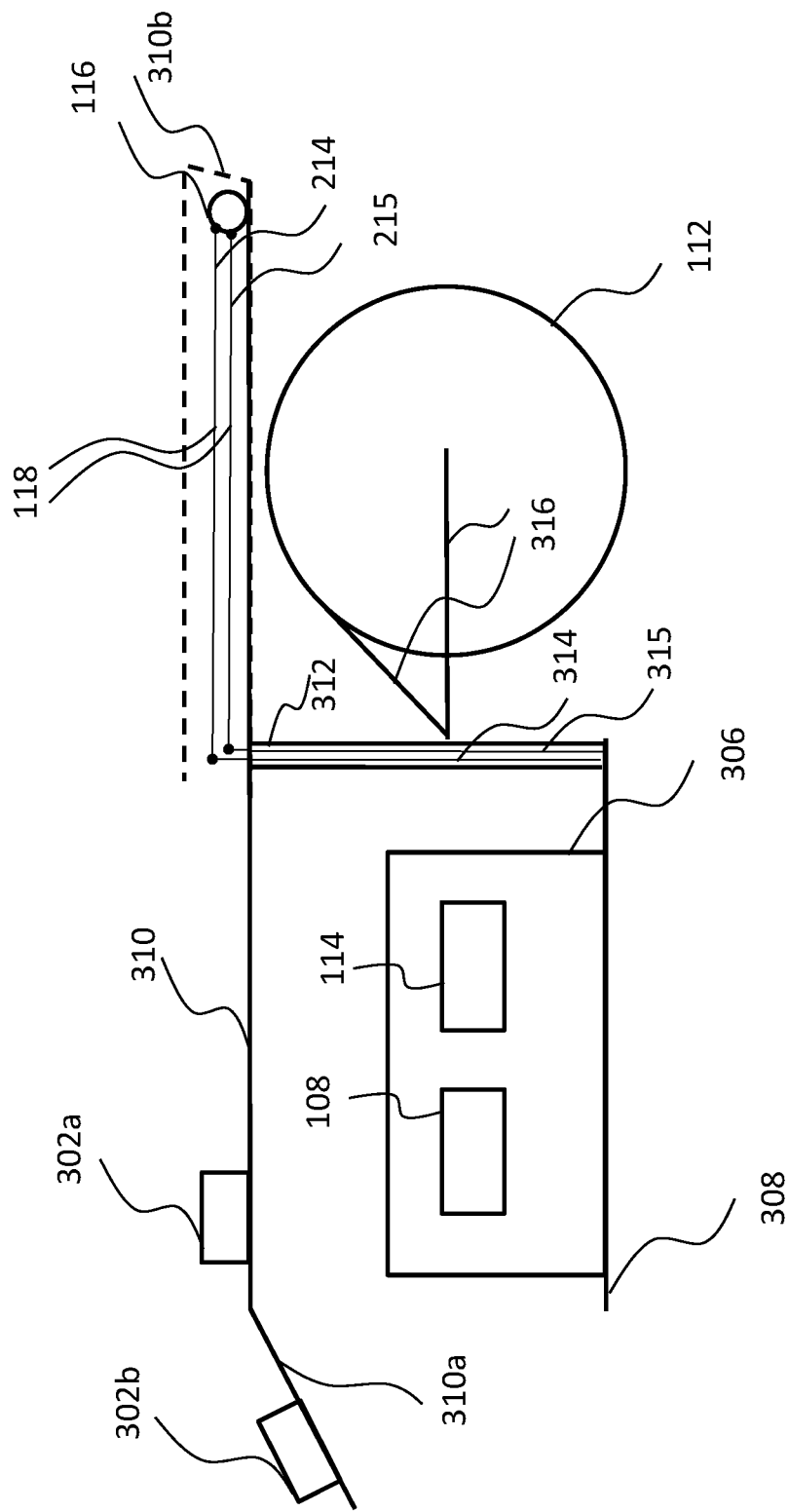

FIG. 5 schematically illustrates a further exemplary hearing device, the hearing device in FIG. 5 corresponding to the hearing device as shown in FIG. 4. In FIG. 5, the second carrier board 310 extends in a direction away from the battery, the extension being a fourth carrier board 310a. The second carrier board 310 further extends in a direction towards the battery, the extension being a fifth carrier board 310b. In FIG. 5, the first microphone 302a and the second microphone 302b are provided at the second carrier board 310 and at the second carrier board extension 310a, respectively. The second carrier board 310 and the second carrier board extension 310a, provides an electromagnetic shield with respect to the multichip assembly 306 comprising the wireless communication unit 108 and the magnetic induction control chip 114, provided at the first carrier board 308. As is seen, the first and second microphones 302a, 302b are provided at a side of the second carrier board 310, 310a facing away from the first carrier board 308.

The second carrier board 310 has a second extension 310b forming a fifth carrier board. The first conductive element 214 and the second conductive element 215 are provided as conductive traces at the second carrier board 310 and at the second carrier board extension 310b to connect the magnetic induction control chip 114 with the magnetic coil 116, and to provide an RF antenna for the wireless communication unit 108. By providing the first and second conductive elements 214, 215 as conductive traces at a carrier board, there are no loose wires in the hearing device, and the electromagnetic influence from the first conductive element 214 and the second conductive element 215 is more predictable, so that variation in electromagnetic influence from such conductive elements between hearing devices is reduced.

Figure 6:
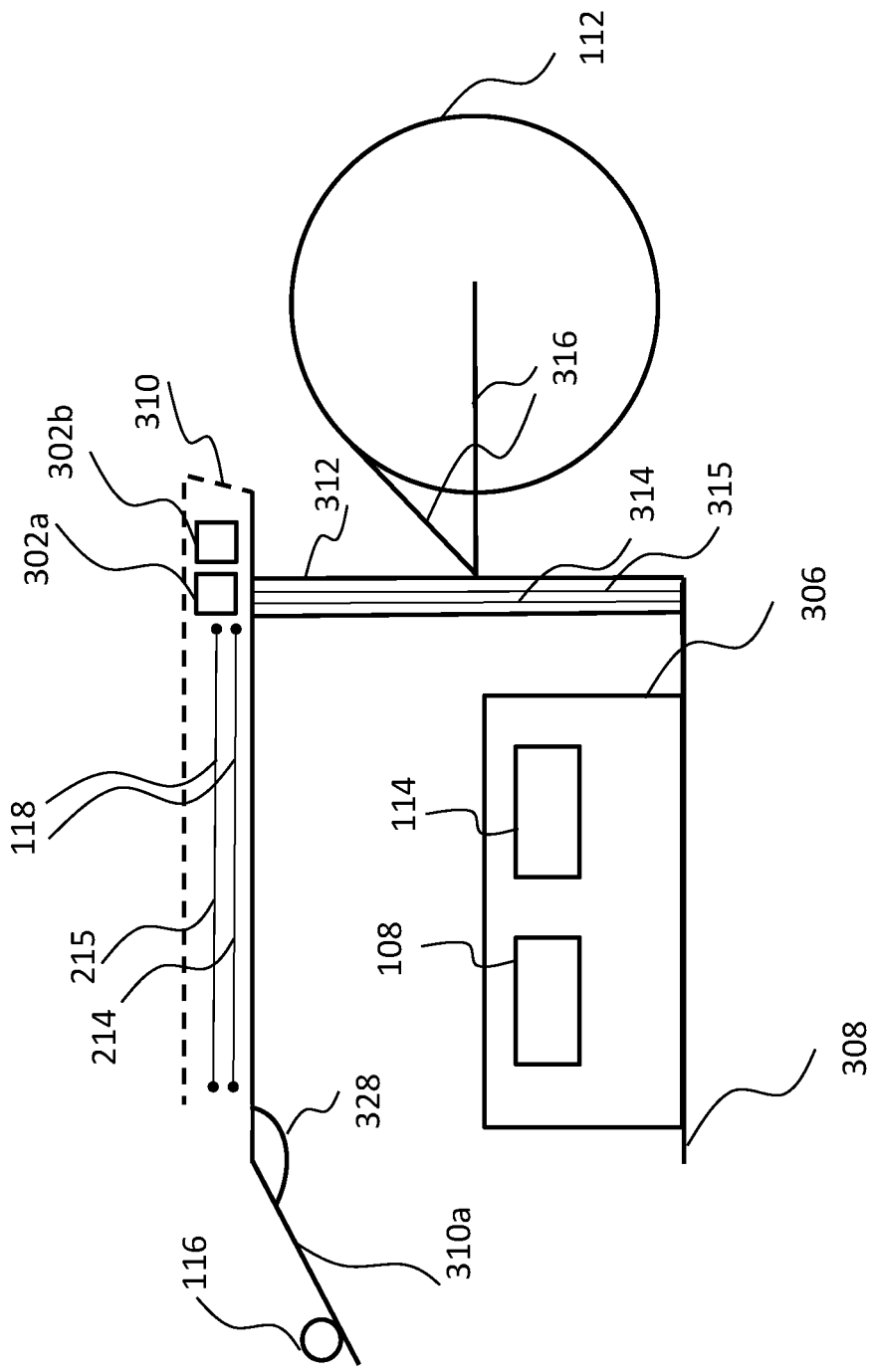

FIG. 6 schematically illustrates an embodiment of a hearing device. In FIG. 6, the hearing device comprises a first and a second microphone 302a, 302b, being positioned at the second carrier board 310. The magnetic induction coil 116 is positioned at second carrier board extension, or fourth carrier board, 310a. The second carrier board extension, or fourth carrier board, 310a, is bend with respect to the second carrier board 310, such as forming an angle 328 of more than 90 degrees with the second carrier board 310, such as an angle of between 130 and 150 degrees, to provide a shielding effect between the magnetic induction coil 116 and the first and second microphones 302a, 302b. In FIG. 6, the first and second conductive elements 214, 215 are provided as traces in the second carrier board 310 and/or in the second carrier board extension 310a. For simplicity, the specific connections between hybrid multichip assembly 306 and first and second conductive elements 214, 215 are not shown. The first and second conductive elements may be interconnected to the hybrid multichip assembly in any known way, for example via first and second microphone wires 314, 315, illustrated as conductive traces in carrier board 312.

It is envisaged that any interconnections may be feasible, including loose wires running along the carrier boards.

Furthermore, exemplary hearing devices are set out in the following embodiments:

1. A hearing device comprising
one or more microphones configured to generate one or more microphone output signals based on a received audio signal,
a signal processor configured to process the one or more microphone output signals,
a wireless communication unit, and
a magnetic induction control chip,
wherein the magnetic induction control chip is interconnected to a first end of a first conductive element and to a first end of a second conductive element,
wherein the wireless communication unit is interconnected to the first end of the first conductive element and to the first end of the second conductive element, and wherein a second end of the first conductive element and a second end of the second conductive element are interconnected via a magnetic induction coil.
2. A hearing device according to embodiment 1, wherein the first conductive element and the second conductive element couple electromagnetically at radio frequencies to form an RF antenna.
3. A hearing device according to any of the preceding embodiments, wherein the wireless communication unit is configured for emission and reception of an electromagnetic field.
4. A hearing device according to embodiment 3, wherein the length of the first and second conductive elements corresponds to approximately a quarter of a wavelength of the electromagnetic field.
5. A hearing device according to any of the preceding embodiments, wherein an impedance of the magnetic induction coil is selected so that the RF antenna has a free end at radio frequencies.
6. A hearing device according to any of the preceding embodiments, wherein the magnetic induction control chip is connected to the first end of the first conductive element through a first inductor and to the first end of the second conductive element through a second inductor.
7. A hearing device according to any of the preceding embodiments, wherein the wireless communication unit is connected to the first end of the first conductive element through a first capacitor and to the first end of the second conductive element through a second capacitor.
8. A hearing device according to any of the preceding embodiments, wherein the hearing device comprises a battery.
9. A hearing device according to embodiment 8, wherein the magnetic induction control chip and the wireless communication unit are provided at a first side of the battery, and wherein the magnetic induction coil is provided at a second side of the battery, wherein the first side is different from the second side.
10. A hearing device according to embodiment 9, wherein the battery provides an electromagnetic shield between the magnetic induction control chip and the wireless communication unit provided at the first side of the battery and the magnetic induction coil provided at the second side of the battery.
11. A hearing device according to any of the preceding embodiments, wherein at least a part of the first conductive element and at least a part of the second conductive element interconnects the signal processor and the one or more microphones.
12. A hearing device according to embodiment 11, wherein the one or more microphones are provided at a carrier board; wherein the signal processor is provided at the carrier board, and wherein the at least part of the first conductive element and the at least part of the second conductive element are provided as conductive traces in the carrier board interconnecting the one or more microphones and the signal processor.
13. A hearing device according to any of the preceding embodiments, wherein one or more of the magnetic induction control chip, the wireless communication unit and the signal processor are provided in a multichip assembly, and wherein the multichip assembly is provided at a carrier board.
14. A hearing device according to any of embodiments 12-13, wherein the magnetic induction coil is provided at the carrier board, and wherein the carrier board interconnecting the multichip assembly and the magnetic induction coil comprises the first conductive element and the second conductive element provided as conductive traces.
15. A hearing device according to any of embodiments 12-14, wherein the carrier board comprises an electromagnetic shielding layer.
16. A hearing device according to embodiment 15, wherein the carrier board is configured to form an electromagnetic shield between the multichip assembly and the one or more microphones.
17. A hearing device according to any of embodiments 8, 11-16, wherein the magnetic induction coil is provided at the first side of the battery, wherein the multichip assembly is provided at the first side of the battery, and wherein the carrier board provides an electromagnetic shield between the multichip assembly and the magnetic induction coil.
18. A hearing device according to any of the preceding embodiments, wherein the magnetic induction coil has a longitudinal direction being parallel to an ear-to-ear axis of a user of the hearing device, when the hearing device is provided in the intended operational position at the ear of a user.
19. A hearing device according to any of embodiments 8-18, wherein the battery is a rechargeable battery and wherein the hearing device comprises a re-chargeable battery controller.
20. A hearing device according to embodiment 19, wherein the re-chargeable battery controller is part of the multichip assembly.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

REFERENCE SIGNS LIST

100 Hearing Device
102 Microphones, one or more
104 Signal Processor
106 Speaker
108 Wireless communication unit
110 Power Circuit
112 Battery
114 MI Control chip 116 MI Coil
118 RF Antenna
204a, 204b MI conducting wires
206a, 206b RF transmission lines
208 Balun
210a, 210b Inductors
211a, 211b Capacitors
212 First end of first conductive element
213 First end of second conductive element
214 First conductive element
215 Second conductive element
216 Second end of first conductive element
217 Second end of second conductive element
302a, 302b Microphones
306 Hybrid Multi Chip Assembly
308 First carrier board (Flex PCB)
310 Second carrier board (Flex PCB)
310a, 310b second carrier board extensions
312 Third carrier board
314 First microphone wire
315 Second microphone wire
316 Battery contacts
318 Center axis of battery
320 First side of battery
322 Second side of battery
323 Hearing device
324 First end of hearing device
326 Second end of hearing device

The invention claimed is:

1. A hearing device comprising:
one or more microphones configured to generate one or more microphone output signals based on a received audio signal;
a signal processor coupled to the one or more microphones;
a wireless communication unit;
a magnetic induction control chip; and
a magnetic induction coil;
wherein the magnetic induction control chip is coupled to a first end of a first conductive element and to a first end of a second conductive element;
wherein the wireless communication unit is coupled to the first end of the first conductive element and to the first end of the second conductive element, and wherein a second end of the first conductive element and a second end of the second conductive element are coupled via the magnetic induction coil;
wherein the first conductive element and the second conductive element are coupled electromagnetically at radio frequencies to form an RF antenna; and
wherein an impedance of the magnetic induction coil is selected so that the RF antenna has a free end at the radio frequencies.

2. A hearing device comprising:
one or more microphones configured to generate one or more microphone output signals based on a received audio signal;
a signal processor coupled to the one or more microphones;
a wireless communication unit;
a magnetic induction control chip; and
a magnetic induction coil;
wherein the magnetic induction control chip is coupled to a first end of a first conductive element and to a first end of a second conductive element;
wherein the wireless communication unit is coupled to the first end of the first conductive element and to the first end of the second conductive element, and wherein a second end of the first conductive element and a second end of the second conductive element are coupled via the magnetic induction coil; and
wherein a length of the first conductive element and/or the second conductive element corresponds to approximately a quarter of a wavelength of an electromagnetic field associated with the wireless communication unit.

3. The hearing device according to claim 2, wherein the first conductive element and the second conductive element are coupled electromagnetically at radio frequencies to form an RF antenna.

4. A hearing device comprising:
one or more microphones configured to generate one or more microphone output signals based on a received audio signal;
a signal processor coupled to the one or more microphones;
a wireless communication unit;
a magnetic induction control chip; and
a magnetic induction coil;
wherein the magnetic induction control chip is coupled to a first end of a first conductive element and to a first end of a second conductive element;
wherein the wireless communication unit is coupled to the first end of the first conductive element and to the first end of the second conductive element, and wherein a second end of the first conductive element and a second end of the second conductive element are coupled via the magnetic induction coil; and
wherein the magnetic induction control chip is coupled to the first end of the first conductive element through a first inductor, and is coupled to the first end of the second conductive element through a second inductor.

5. The hearing device according to claim 1, wherein the wireless communication unit is coupled to the first end of the first conductive element through a first capacitor, and is coupled to the first end of the second conductive element through a second capacitor.

6. A hearing device comprising:
one or more microphones configured to generate one or more microphone output signals based on a received audio signal;
a signal processor coupled to the one or more microphones;
a wireless communication unit;
a magnetic induction control chip; and
a magnetic induction coil;
wherein the magnetic induction control chip is coupled to a first end of a first conductive element and to a first end of a second conductive element;
wherein the wireless communication unit is coupled to the first end of the first conductive element and to the first end of the second conductive element, and wherein a second end of the first conductive element and a second end of the second conductive element are coupled via the magnetic induction coil; and
wherein the hearing device further comprises a battery, wherein the magnetic induction control chip and the wireless communication unit are closer to a first side of the battery than to a second side of the battery, and wherein the magnetic induction coil is closer to the second side of the battery than to the first side of the battery, wherein the first side is different from the second side.

7. A hearing device comprising:
one or more microphones configured to generate one or more microphone output signals based on a received audio signal;
a signal processor coupled to the one or more microphones;
a wireless communication unit;
a magnetic induction control chip; and
a magnetic induction coil;
wherein the magnetic induction control chip is coupled to a first end of a first conductive element and to a first end of a second conductive element;
wherein the wireless communication unit is coupled to the first end of the first conductive element and to the first end of the second conductive element, and wherein a second end of the first conductive element and a second end of the second conductive element are coupled via the magnetic induction coil; and
the hearing device further comprises a battery, wherein the battery has a position in the hearing device that allows the battery to provide an electromagnetic shield between (1) the magnetic induction control chip and the wireless communication unit, and (2) the magnetic induction coil.

8. The hearing device according to claim 1, wherein at least a part of the first conductive element and at least a part of the second conductive element are coupled to the signal processor and to the one or more microphones.

9. A hearing device comprising:
one or more microphones configured to generate one or more microphone output signals based on a received audio signal;
a signal processor coupled to the one or more microphones;
a wireless communication unit;
a magnetic induction control chip; and
a magnetic induction coil;
wherein the magnetic induction control chip is coupled to a first end of a first conductive element and to a first end of a second conductive element;
wherein the wireless communication unit is coupled to the first end of the first conductive element and to the first end of the second conductive element, and wherein a second end of the first conductive element and a second end of the second conductive element are coupled via the magnetic induction coil;
wherein at least a part of the first conductive element and at least a part of the second conductive element are coupled to the signal processor and to the one or more microphones; and
wherein the one or more microphones are at a carrier board, wherein the signal processor is at the carrier board, and wherein the at least a part of the first conductive element and the at least a part of the second conductive element are conductive traces in the carrier board.

10. A hearing device comprising:
one or more microphones configured to generate one or more microphone output signals based on a received audio signal;
a signal processor coupled to the one or more microphones;
a wireless communication unit;
a magnetic induction control chip; and
a magnetic induction coil;

wherein the magnetic induction control chip is coupled to a first end of a first conductive element and to a first end of a second conductive element;
wherein the wireless communication unit is coupled to the first end of the first conductive element and to the first end of the second conductive element, and wherein a second end of the first conductive element and a second end of the second conductive element are coupled via the magnetic induction coil; and
wherein one or a combination of the magnetic induction control chip, the wireless communication unit, and the signal processor, is in a multichip assembly.

11. The hearing device according to claim 10, wherein the multichip assembly is at a carrier board.

12. The hearing device according to claim 11, wherein the magnetic induction coil is at the carrier board.

13. The hearing device according to claim 11, wherein the first conductive element and the second conductive element are conductive traces in the carrier board.

14. The hearing device according to claim 13, wherein the conductive traces in the carrier board couple to the multichip assembly and the magnetic induction coil.

15. The hearing device according to claim 11, wherein the carrier board is configured to form an electromagnetic shield between the multichip assembly and the one or more microphones.

16. The hearing device according to claim 10, wherein the hearing device further comprises a battery; and
wherein the magnetic induction coil and the multichip assembly are at a same side of the battery.

17. The hearing device according to claim 10,
wherein the hearing device further comprises a carrier board, wherein the carrier board provides an electromagnetic shield between the multichip assembly and the magnetic induction coil.

18. A hearing device comprising:
one or more microphones configured to generate one or more microphone output signals based on a received audio signal;
a signal processor coupled to the one or more microphones;
a wireless communication unit;
a magnetic induction control chip; and
a magnetic induction coil;
wherein the magnetic induction control chip is coupled to a first end of a first conductive element and to a first end of a second conductive element;
wherein the wireless communication unit is coupled to the first end of the first conductive element and to the first end of the second conductive element, and wherein a second end of the first conductive element and a second end of the second conductive element are coupled via the magnetic induction coil; and
wherein the magnetic induction coil has a longitudinal direction that is parallel to an ear-to-ear axis of a user of the hearing device, when the hearing device is at an intended operational position with respect to an ear of the user.

19. The hearing device according to claim 6, wherein the wireless communication unit is coupled to the first end of the first conductive element through a first capacitor, and is coupled to the first end of the second conductive element through a second capacitor.

20. The hearing device according to claim 7, wherein the wireless communication unit is coupled to the first end of the first conductive element through a first capacitor, and is coupled to the first end of the second conductive element through a second capacitor.

21. The hearing device according to claim 9, wherein the wireless communication unit is coupled to the first end of the first conductive element through a first capacitor, and is coupled to the first end of the second conductive element through a second capacitor.

22. The hearing device according to claim 10, wherein the wireless communication unit is coupled to the first end of the first conductive element through a first capacitor, and is coupled to the first end of the second conductive element through a second capacitor.

23. The hearing device according to claim 18, wherein the wireless communication unit is coupled to the first end of the first conductive element through a first capacitor, and is coupled to the first end of the second conductive element through a second capacitor.

* * * * *